United States Patent
Krützfeldt et al.

(10) Patent No.: US 10,570,769 B2
(45) Date of Patent: Feb. 25, 2020

(54) MACHINE AND METHOD FOR OPERATING THE MACHINE

(71) Applicant: Siemens Aktiengesellschaft, Munich (DE)

(72) Inventors: Joachim Krützfeldt, Mülheim an der Ruhr (DE); Oliver Schneider, Wesel (DE)

(73) Assignee: Siemens Aktiengesellschaft, Munich (DE)

(*) Notice: Subject to any disclaimer, the term of this patent is extended or adjusted under 35 U.S.C. 154(b) by 400 days.

(21) Appl. No.: 15/320,607

(22) PCT Filed: Jul. 21, 2015

(86) PCT No.: PCT/EP2015/066640
§ 371 (c)(1),
(2) Date: Dec. 20, 2016

(87) PCT Pub. No.: WO2016/016048
PCT Pub. Date: Feb. 4, 2016

(65) Prior Publication Data
US 2018/0209289 A1    Jul. 26, 2018

(30) Foreign Application Priority Data

Jul. 30, 2014  (EP) .................................. 14179077

(51) Int. Cl.
*F01D 11/06*  (2006.01)
*F01D 25/18*  (2006.01)
(Continued)

(52) U.S. Cl.
CPC ............. *F01D 11/06* (2013.01); *F01D 11/04* (2013.01); *F01D 25/166* (2013.01); *F01D 25/18* (2013.01);
(Continued)

(58) Field of Classification Search
CPC ...... F01D 11/06; F01D 25/166; F01D 25/186; F01D 11/04; F01D 25/18; F16J 15/4476; F04D 29/104; F02C 7/28
(Continued)

(56) References Cited

U.S. PATENT DOCUMENTS

2007/0107438 A1    5/2007  Morimoto et al.
2012/0201661 A1*   8/2012  Pandey ................... F01D 11/04
                                                            415/175

FOREIGN PATENT DOCUMENTS

| DE | 4420973 A1 | 12/1995 |
| GB | 1045973 A  | 10/1966 |
| GB | 2167141 A  | 5/1986  |

OTHER PUBLICATIONS

CN Office Action dated Jul. 17, 2017, for CN patent application No. 201580039720.1.
(Continued)

*Primary Examiner* — Essama Omgba
*Assistant Examiner* — Stephen A Mick
(74) *Attorney, Agent, or Firm* — Beusse Wolter Sanks & Maire

(57) ABSTRACT

A machine having a shaft with a stage having a first shaft section having a first diameter, a second shaft section having a second diameter that is shorter than the first, forming a radially extending rotatable shaft end surface; a housing; and a bearing supporting the shaft on the housing by its second shaft section, and lubricated by a lubrication fluid. A sealing chamber has a sealing fluid that prevents the lubrication from leaving the bearing, and is axially limited by the shaft end surface and bearing end side, and radially inwardly limited by the second shaft section released from the bearing. A radially extending and stationary separator plate is in the sealing chamber to achieve an aerodynamic shielding of the bearing end side from the shaft end surface. When the
(Continued)

shaft is rotating, the region between the separator plate and the bearing end side is substantially non-rotational.

16 Claims, 3 Drawing Sheets

(51) Int. Cl.
    *F01D 11/04* (2006.01)
    *F01D 25/16* (2006.01)
    *F16J 15/447* (2006.01)
    *F02C 7/28* (2006.01)
    *F04D 29/10* (2006.01)

(52) U.S. Cl.
    CPC ........ *F01D 25/186* (2013.01); *F16J 15/4476* (2013.01); *F02C 7/28* (2013.01); *F04D 29/104* (2013.01)

(58) Field of Classification Search
    USPC ........................................................ 415/175
    See application file for complete search history.

(56) References Cited

OTHER PUBLICATIONS

EP Search Report dated Jan. 26, 2015, for EP application No. 14179077.4.
International Search Report dated Oct. 7, 2015, for PCT application No. PCT/EP2015/066640.
IPPR (PCT/IPEA/416) dated Jul. 27, 2016, for PCT application No. PCT/EP2015/066640.

\* cited by examiner

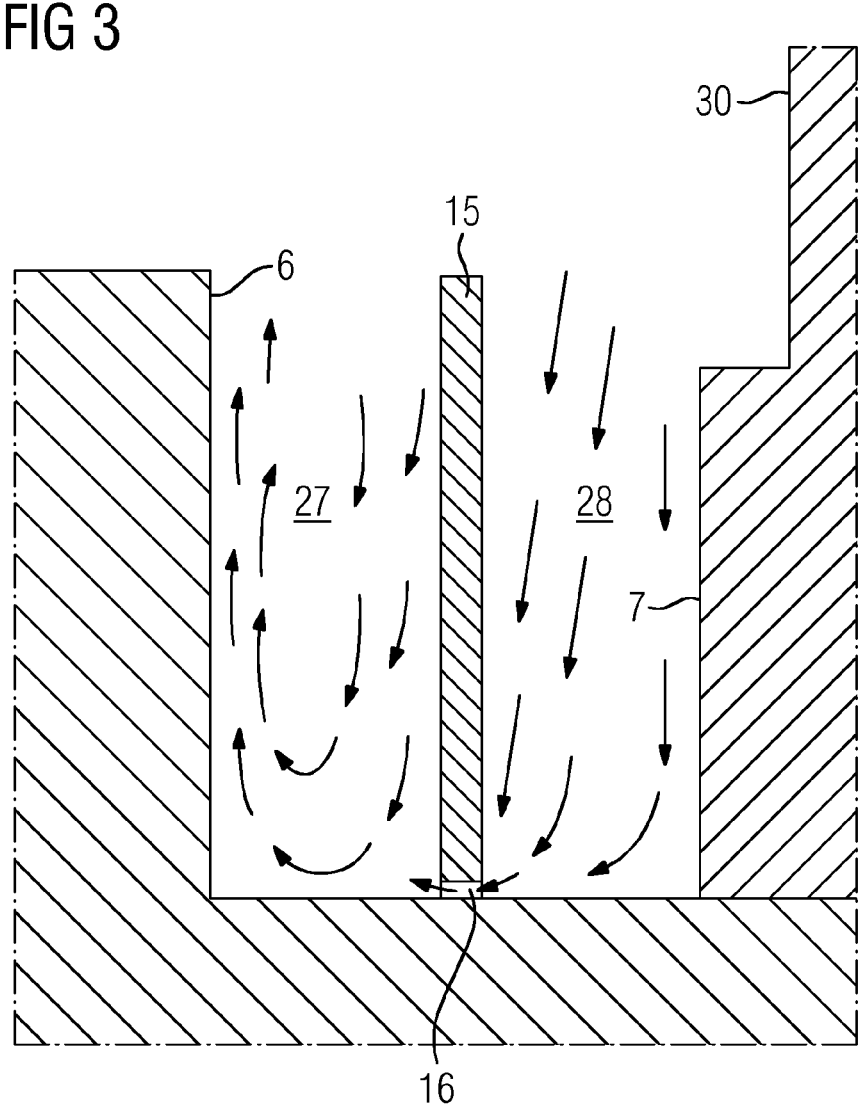

MACHINE AND METHOD FOR OPERATING THE MACHINE

CROSS REFERENCE TO RELATED APPLICATIONS

This application is the US National Stage of International Application No. PCT/EP2015/066640 filed Jul. 21, 2015, and claims the benefit thereof. The International Application claims the benefit of European Application No. EP14179077 filed Jul. 30, 2014. All of the applications are incorporated by reference herein in their entirety.

FIELD OF INVENTION

The invention relates to a machine with a shaft and a bearing, and to a method for operating the machine.

BACKGROUND OF INVENTION

A machine, such as, for example, a continuous-flow machine, with a shaft and an oil-lubricated bearing can be provided with a blocking gas seal in order to prevent oil from leaking from the bearing. The blocking gas seal can have a blocking chamber between a rotating shaft wall which extends radially and the stationary bearing housing. When the machine is operating, when the shaft rotates and a blocking fluid is applied to the blocking gas seal, the blocking fluid in the blocking chamber is set in rotation via friction against the shaft wall. Owing to the action of the centrifugal force, a drop in pressure forms radially inward in the rotating blocking fluid, as a result of which the pressure at the bearing housing is disadvantageously low so that the oil can leak from the bearing housing.

The leaking of the oil is particularly critical when it occurs at the turbine outlet of a gas turbine because the oil can here come into contact with hot parts of the gas turbine. The oil can carbonize or burn as a result of the contact and consequently endanger the safe operation of the machine. The problem is usually solved by the blocking fluid being applied at high pressure to the blocking gas seal, but this is disadvantageous for the efficiency of the gas turbine.

A bearing arrangement is moreover known from US 2012/201661 A1, in which an elevated pressure can be generated in an intermediate space which is shielded in each case via a labyrinth seal, on the one hand, with respect to a hydraulic bearing and, on the other hand, with respect to a space at atmospheric pressure. The elevated pressure is generated with the aid of a fluid line which opens into the intermediate space and by means of which a corresponding fluid can be conveyed. The intermediate space can thus be further divided by a shield in order to establish the partial space with the localized elevated pressure as close to the end of the labyrinth seal as possible. It is, however, hereby disadvantageous that there is a need for an elevated pressure to generate a reliable seal.

SUMMARY OF INVENTION

An object of the invention is to provide a machine with a shaft and a bearing, and a method for operating the machine, wherein a good sealing effect relative to the bearing is obtained.

The machine according to the invention has a shaft, which has a step, so that a first shaft portion with a first diameter, a second shaft portion with a second diameter which is shorter than the first diameter, and a radially extending and rotatable shaft end face are formed, a housing and a bearing, which supports the shaft on the housing at its second shaft portion and is lubricated with a lubricating fluid, wherein the shaft end face faces a radially extending and stationary bearing end side, as a result of which a blocking chamber, to which a blocking fluid can be applied by means of which leaking of the lubricating fluid from the bearing can be prevented, is formed and is limited axially by the shaft end face and the bearing end side and radially inward by the second shaft portion left free by the bearing, characterized in that the blocking chamber is connected to the environment by a passage, and in that a radially extending and stationary dividing plate is arranged in the blocking chamber so that an aerodynamic shielding of the bearing end side from the shaft end face is effected, as a result of which there are essentially no vortices, i.e. no swirling, in the region between the dividing plate and the bearing end side when the shaft rotates.

The region between the dividing plate and the bearing end side is not limited axially by any rotating walls so that it is not possible for any vortices to occur in this region which determine the pressure conditions. The region between the shaft end face and the dividing plate is limited axially by a rotating wall, namely by the bearing end side, so that a vortex can form in this region. However, owing to the shielding effect of the dividing plate, this vortex does not act on the region between the dividing plate and the bearing end side. In the region between the dividing plate and the bearing end side, the blocking fluid thus essentially has the pressure which is applied to the blocking chamber and is exposed only to wall friction losses. The pressure of the blocking fluid at the bearing end side is thus high, as a result of which a good sealing effect with respect to the bearing can be obtained. The dividing plate represents a structural measure which is simple in such a way that existing machines can also be retrofitted with the dividing plate.

It is advantageous that a radial gap is formed between the radially inwardly situated longitudinal end of the dividing plate and the shaft. Grinding of the dividing plate on the shaft is advantageously consequently prevented. The radial gap advantageously has an extent in the radial direction of 0.1 mm to 10 mm. The grinding can advantageously be prevented by the lower threshold of 0.1 mm. The upper threshold of 10 mm advantageously ensures that any vortex is prevented from forming in the region between the dividing plate and the bearing end side. The upper threshold also ensures that it is not possible for a lot of blocking fluid to pass via the radial gap into the region between the shaft end face and the dividing plate in such a way that the pressure at the bearing end side falls significantly.

It is advantageous that the dividing plate is arranged parallel to the shaft end face and the bearing end side. As a result, narrowed points for the flow of the blocking fluid can be avoided.

The narrowed points can disadvantageously cause the formation of vortices. The dividing plate advantageously has a distance from the shaft end face which is from 0.25*d to 0.75*d, more advantageously from 0.5*d to 0.75*d, particularly advantageously 0.5*d, wherein d is the distance between the shaft end face and bearing end side. The minimum distance of the dividing plate from the bearing end side advantageously ensures that the blocking fluid is not heated by friction in such a way that it can affect the bearing. The minimum distance of the dividing plate from the shaft end face likewise advantageously ensures that the blocking fluid is not significantly heated by friction. The dividing plate is rather arranged closer to the bearing end side than to the shaft end face in order to minimize the shearing force in the region between the rotating shaft end face and the dividing plate.

The dividing plate advantageously extends radially outward essentially as far at least as the radially outwardly situated end of the shaft end face. Such a shielding of the bearing end side from the shaft end face is thus advantageously achieved in such a way that the region between the dividing plate and the bearing end side has essentially no vortices when the shaft rotates. It is advantageous that the dividing plate is arranged in the form of a circle around the shaft. By virtue of the dividing plate being arranged with no interruption and in the form of a circle around the shaft in the circumferential direction, it is also not possible for any locally limited vortices to form between the dividing plate and the bearing end side.

The dividing plate is advantageously fastened by means of spacers attached on the bearing end side and on the dividing plate. It is consequently possible to insert the dividing plate, together with the bearing, into the machine or remove it from the machine. The bearing represents a wearing part of the machine and thus the machine can be retrofitted with the dividing plate particularly simply during routine replacement of the bearing.

It is advantageous that the machine is a continuous-flow machine, in particular a gas turbine. It is moreover in particular advantageous that the blocking chamber with the dividing plate is arranged at the turbine outlet of the gas turbine. It is advantageous to provide the dividing plate here because leakage of the lubricating fluid at the turbine outlet of the gas turbine is particularly critical because it can come into contact there with hot exhaust gases and hot parts of the gas turbine and thus burn.

The method according to the invention for operating a machine has the steps: rotate the shaft; apply air from the environment at atmospheric conditions to the blocking chamber as the blocking fluid, as a result of which leakage of the lubricating fluid from the bearing into the blocking chamber is prevented. Because air from the environment is used, which in particular is removed from a sound-insulating enclosure of the machine, the efficiency of the machine is high. As a result of providing the dividing plate, leakage of the lubricating fluid from the bearing into the blocking chamber can be prevented in all operating conditions.

BRIEF DESCRIPTION OF THE DRAWINGS

The invention is explained in detail below with the aid of the attached schematic drawings, in which:

FIG. 3 shows the flow conditions in a blocking chamber of the machine.

DETAILED DESCRIPTION OF INVENTION

Figure 1:
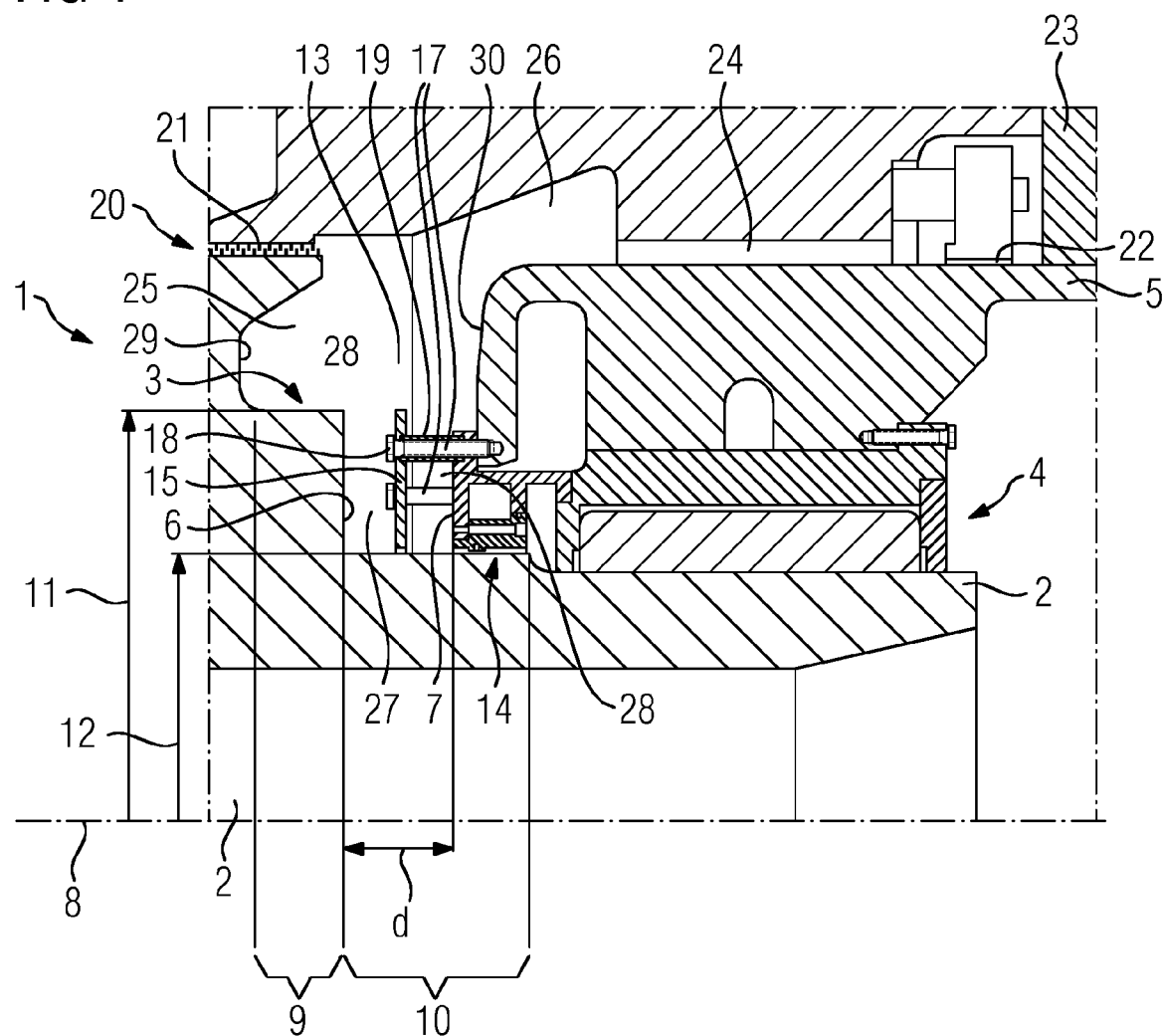
FIG. 1 shows a longitudinal section through a machine.
Figure 2:
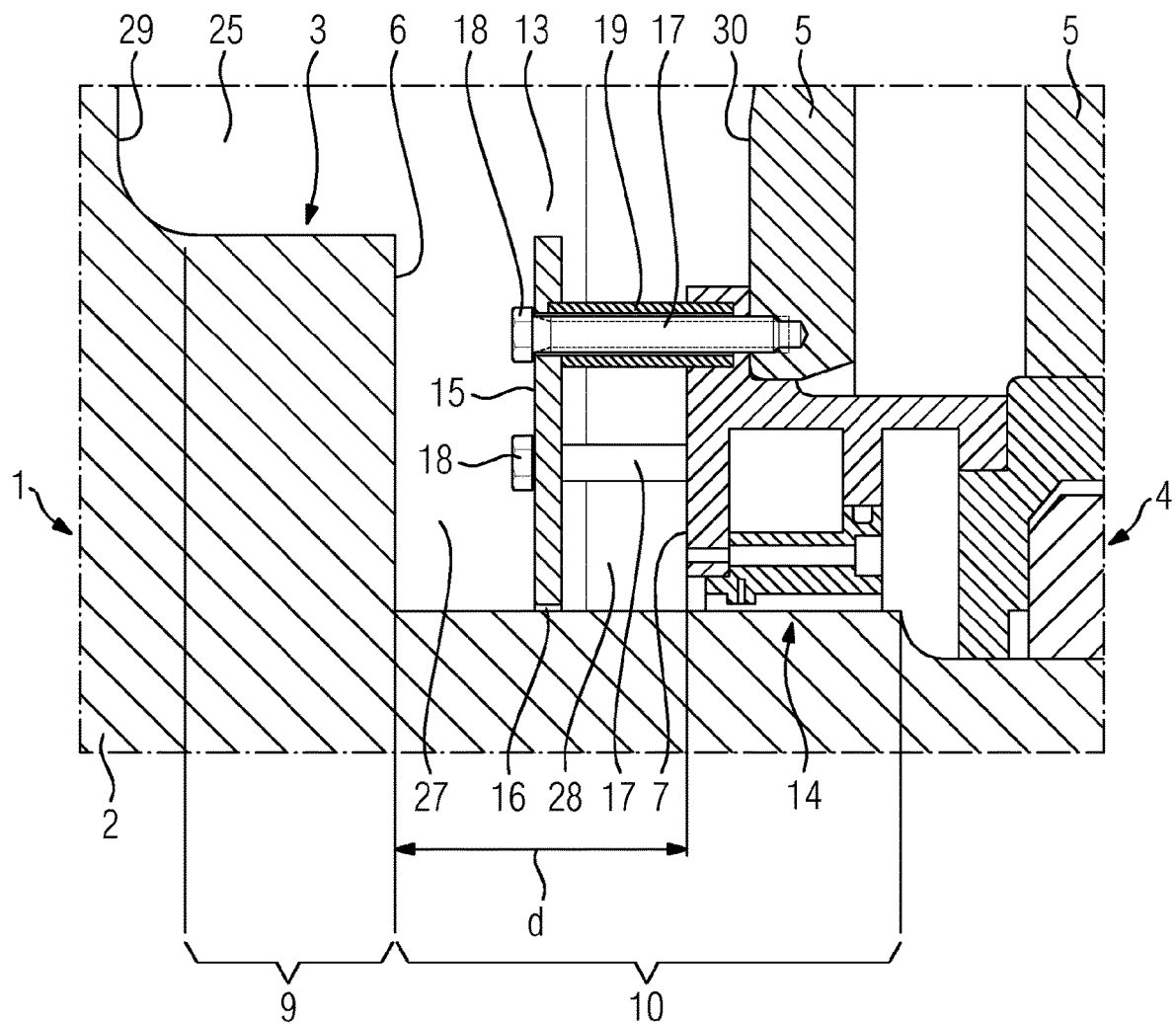
FIG. 2 shows a detailed view of the longitudinal section from FIG. 1.

As can be seen from FIGS. 1 to 3, a machine 1 has a shaft 2 which can rotate about a shaft axis 8. Furthermore, the shaft 2 has a step 3, as a result of which the shaft 2 has, in the axial direction, a first shaft portion 9 with a first radius 11 and a second shaft portion 10 with a second radius 12. The second radius 12 is here shorter than the first radius 11. As a result of the step 3, the shaft 2 has a rotatable shaft end face 6 which is arranged in the interface between the first shaft portion 10 and second shaft portion 11 and extends radially between the first radius 11 and the second radius 12. The shaft end face 6 is consequently in the form of a circle.

The machine 1 furthermore has a stationary housing 5 and a bearing 4 which supports the shaft 2 at its second shaft portion 10 on the housing 5. The bearing 4 is lubricated with a lubricating fluid, in particular oil, and is in particular a sliding bearing. The bearing 4 has a stationary bearing end side 7 which is arranged parallel to the shaft end face 6 and facing the shaft end face 6. A stationary housing end side 30, which is likewise arranged facing shaft end face 6, is arranged radially outside the bearing end side 7.

The machine 1 has a blocking chamber 13 to which a blocking fluid is applied when the machine 1 is operating in order to prevent leakage of the lubricating fluid from the bearing 4 into the blocking chamber 13. The blocking chamber 13 is limited axially by the shaft end face 6 and the bearing end side 7. The blocking chamber 13 is limited radially inward by the radial outer side of that portion of the second shaft portion 10 which extends from the shaft end face 6 to the bearing end side 7.

The bearing 4 has a bearing seal 14 for sealing the bearing 4 off from the blocking chamber 13. The bearing seal 14 is arranged on the radial outer side of the shaft 2 in the region of the second shaft portion 10 and in the region of the bearing end side 7. In order to prevent leakage of the lubricating fluid from the bearing 4, it is necessary that the pressure of the blocking fluid at that end of the bearing seal 14 facing the blocking chamber 13 is higher than the pressure of the lubricating fluid at this end.

A stationary and radially extending dividing plate 15 is introduced into the blocking chamber 13. The dividing plate 15 can, for example, be a metal sheet. The dividing plate 15 is arranged with its long side parallel to the shaft end face 6 and the bearing end side 7 and formed in the shape of a circle. By introducing the dividing plate 15 into the blocking chamber 13, a rotor/stator chamber 27, which extends from the shaft end face 6 to the dividing plate 15, and a stator/stator chamber 28, which extends from the dividing plate 15 to the bearing end side 7, are formed. The rotor/stator chamber 27 and the stator/stator chamber 28 are arranged next to each other in the axial direction.

A radial gap 16, which has an extent in the radial direction of 0.1 mm to 10 mm, is formed between the radially inwardly situated longitudinal end of the dividing plate 15 and the radial outer side of the second shaft portion 10. The dividing plate 15 has a distance from the shaft end face 6 which is from 0.25*d to 0.75*d, wherein d is the distance between the shaft end face 6 and the bearing end side 7. The dividing plate 15 according to FIGS. 1 to 3 extends radially outward essentially as far as the first radius 11. It is, however, conceivable also for the dividing plate 15 to be designed so that it is further radially outward.

The blocking chamber 13 has a first recess 25 which is introduced into the shaft 2 and adjoins the first radius 11 radially outwardly. A recess end face 29, which is arranged facing the bearing end side 7, is formed by the first recess 25. The blocking chamber 13 furthermore has a second recess 26 which extends radially outward. The blocking fluid at atmospheric pressure can pass from the environment 23 of the machine 1 into the blocking chamber 13 via a passage through which fluid can flow. In the exemplary embodiment shown, the passage comprises an outer gap 22, a duct 24, and the second recess 26 and ducts (not shown further), as a result of which the blocking chamber 13 is fluidically connected to the environment. A turbine gap 20 extends from the blocking chamber 13 to an internal turbine space. The turbine gap 20 has a turbine seal 21. So that no exhaust gas from the internal turbine space can pass via the turbine gap 20 into the blocking chamber 13, it is necessary that the pressure of the blocking gas in the blocking chamber 13 is higher than the pressure of the exhaust gas.

The machine 1 has multiple spacers 17 which are each attached to the bearing end side 7 and to the dividing plate 15 in order to fasten the dividing plate 15. Each of the spacers traverses a respective hole in the dividing plate 15 and has a spacer head by means of which the axial displacement of the dividing plate 15 is limited in the direction of the shaft end face 6. Each spacer 17 is enclosed in a sleeve 19 by means of which the axial displacement of the dividing plate 15 is limited in the direction of the bearing end side 7.

The flow conditions occurring in the blocking chamber 13 when the shaft 2 rotates are shown in FIG. 3. When the shaft rotates, a flow occurs in the blocking chamber 13 which is impelled because the blocking fluid is transported radially outward at the rotating shaft end face 6 as a result of friction. For reasons of continuity, in the rotor/stator chamber 27 the blocking fluid at the dividing plate 15 flows radially inward so that a vortex is formed in the rotor/stator chamber 27. A flow which is oriented essentially radially inward and is oriented by the radial gap 16 toward the rotor/stator chamber 27 is formed in the stator/stator chamber 28. The stator/stator chamber 28, i.e. the region between the dividing plate 15 and the bearing end side 7, thus essentially has no vortices.

Small vortices can be formed in the stator/stator chamber 28 in corners or at edges, but these small vortices are unable to determine the pressure in the stator/stator chamber 27. The pressure at the bearing end side 7 is thus higher than would be the case for a blocking chamber with no dividing plate. CFD calculations for a few selected cases have shown that the pressure at the bearing end side 7 at the radially inwardly situated end of the blocking chamber 13 is higher by 2 mbar to 3 mbar than would be the case for the blocking chamber with no dividing plate.

The pressure at the shaft end face 6 is higher than would be the case for the blocking chamber with no dividing plate because a higher pressure is imparted to the vortex in the rotor/stator chamber 28 as a result of the flow through the radial gap 16. CFD calculations have shown that the pressure at the shaft end face 6 at the radially inwardly situated end of the blocking chamber 13 is 1.5 mbar to 2.5 mbar higher than would be the case for the blocking chamber with no dividing plate.

In the blocking chamber 13, the blocking fluid is also conveyed radially outward at the recess end face 29 arranged radially outside the first radius 11. Although the dividing plate 15 according to FIGS. 1 to 3 here extends only essentially as far as the first radius 11, the region radially outside the radius 11 is not critical because here the distance between the recess end face 29 and the bearing end side 7 and/or the housing end side 30 is sufficiently large that no radial pressure difference can form.

Although the invention has been illustrated and described in detail by the preferred exemplary embodiment, the invention is not limited by the disclosed examples and other variants can be derived by a person skilled in the art without going beyond the scope of the invention.

The invention claimed is:

1. A machine comprising:
a shaft configured to rotate about a shaft axis, wherein said shaft has a first shaft portion with a first diameter, and a second shaft portion spaced apart from the first shaft portion in an axial direction defined by the shaft axis, said second shaft portion with a second diameter that is smaller than the first diameter, and a radially extending and rotatable shaft end face formed at an interface between the first shaft portion and the second shaft portion, and
a housing,
a bearing that supports the shaft at the second shaft portion and is lubricated with a lubricating fluid, wherein the shaft end face faces a radially extending and stationary bearing end side of the bearing, as a result of which a blocking chamber is formed, to which a blocking fluid is applied such that leaking of the lubricating fluid from the bearing is preventable, wherein the blocking chamber is limited axially by the shaft end face and the bearing end side and radially inward by the second shaft portion; and
a radially extending and stationary dividing plate arranged to divide the blocking chamber into a first chamber which extends from the shaft end face to the dividing plate and a second chamber which extends from the dividing plate to the bearing end side and wherein the first chamber and the second chamber are arranged next to each other in the axial direction, and wherein a radial gap is formed between a radially inwardly situated longitudinal end of the dividing plate and the shaft to permit fluid communication between the first chamber and the second chamber.

2. The machine as claimed in claim 1, wherein the radial gap has an extent in the radial direction of 0.1 mm to 10 mm.

3. The machine as claimed in claim 1, wherein the dividing plate is arranged parallel to the shaft end face and the bearing end side.

4. The machine as claimed in claim 1, wherein the dividing plate has a distance from the shaft end face which is from 0.25*d to 0.75*d, wherein d is the distance between the shaft end face and the bearing end side.

5. The machine as claimed in claim 1, wherein the dividing plate extends radially outward essentially as far as a radially outwardly situated end of the shaft end face.

6. The machine as claimed in claim 1, wherein the dividing plate is arranged in the form of a circle around the shaft.

7. The machine as claimed in claim 1, wherein the machine is a gas turbine, wherein the blocking chamber with the dividing plate is arranged at a turbine outlet of the gas turbine.

8. The machine as claimed in claim 1, wherein the dividing plate has a distance from the shaft end face which is from 0.5*d to 0.75*d, wherein d is the distance between the shaft end face and the bearing end side.

9. The machine as claimed in claim 1, wherein the dividing plate has a distance from the shaft end face which is 0.5*d, wherein d is the distance between the shaft end face and the bearing end side.

10. The machine as claimed in claim 1, wherein the radial gap is formed so that contact of the dividing plate on the shaft is consequently prevented.

11. The machine as claimed in claim 1, wherein the dividing plate is further arranged so that an aerodynamic shielding of the bearing end side from the shaft end face is effected and there are essentially no vortices in the second chamber between the dividing plate and the bearing end side when the shaft rotates, and wherein the dividing plate is fastened by spacers attached on the bearing end side, wherein both the first chamber and the second chamber divided by the dividing plate are connected to the environment via a common passage.

12. The machine as claimed in claim 11, wherein each spacer is enclosed in a sleeve such that the sleeve is configured to limit axial displacement of the dividing plate in the direction of the bearing end side in the axial direction.

13. The machine as claimed in claim 1, wherein the first chamber and the second chamber extend radially inward to the second shaft portion.

14. The machine as claimed in claim 1, wherein at least a portion of the bearing end side is radially aligned with at least a portion of the shaft end face.

15. A method for using the machine as claimed in claim 1, comprising:

rotating the shaft about the shaft axis;

passing blocking fluid through a duct and into the blocking chamber;

directing the blocking fluid in the first chamber such that the blocking fluid is directed in a radially inward direction along the dividing plate and in a radially outward direction along the shaft end face so that a vortex is formed in the first chamber; and directing the blocking fluid in the second chamber such that the blocking fluid is directed in the radially inward direction along the dividing plate and along the bearing end side so that essentially no vortices are formed in the second chamber.

16. The method as claimed in claim 15, further comprising directing the blocking fluid in the second chamber through the radial gap and into the first chamber.

* * * * *